Nov. 24, 1942.  C. H. MUHL ET AL  2,302,878
MACHINE TOOL
Filed April 26, 1939  8 Sheets-Sheet 4

Patented Nov. 24, 1942

2,302,878

UNITED STATES PATENT OFFICE 2,302,878

MACHINE TOOL

Charles H. Muhl, John Beissman, and Earl E. Opel, Richmond, Ind., assignors to The National Automatic Tool Company, Richmond, Ind., a corporation of Indiana Application April 26, 1939, Serial No. 270,192

18 Claims. (Cl. 77—64)

Our invention relates generally to machine tools, and more particularly to improvements in multi-unit machine tools arranged for performing a large plurality of different operations, such as drilling, reaming, boring, facing and tapping. While the machine tool of our invention may be used for performing the above operations on any machine part, casting, or the like, it is shown here as being particularly adapted for performing these operations on the ends of the cylinder blocks for internal combustion engines.

Briefly, the invention comprises the utilization of a plurality of pairs of partially independently operable machine tool units, arranged linearly upon opposite sides of a work conveyor and indexing mechanism, by means of which the work pieces are successively transferred from one pair of units to the next, for the successive operations to be performed upon the work piece by such units. This indexing mechanism has a reciprocatory motion, so that the work pieces are advanced from one set of machine tool units to the next upon only the forward stroke of the reciprocating conveying means. When the work pieces are in the approximate required position between the machine tool units, locating pins are automatically brought into engagement with the work pieces to locate them exactly in the required positions with respect to the machine tool units, and clamping means are operated rigidly to hold the work pieces in such positions.

The conveying and indexing means, the locating and clamping means and the machine tool units are interlocked principally through electrical circuits, so that these parts are operated in a predetermined sequence, in a manner such that failure of one of these parts to complete its cyclic function causes an interruption in the sequence of operations, thus insuring against improperly timed operation of these parts.

It is thus an object of our invention to provide an improved machine tool capable of performing a very large number of machining operations upon a work piece, such as a cylinder block, or the like.

More specifically, it is among the objects of our invention to provide a machine tool in which:

(a) There is provided a plurality of linearly arranged semi-independent machine tool units, and a reciprocable conveying and indexing means for advancing work pieces successively from one station to the next;

(b) Improved means are provided for conveying and indexing work pieces from one station to the next;

(c) Improved means are provided for locating and clamping work pieces in position to be operated upon by the tools;

(d) The various machine tool units are provided with improved interlocking circuits whereby assurance is had that the various parts of the machine tool will operate in proper sequence;

(e) Improved means is provided for conveying and indexing work pieces without the necessity of applying any fixtures to the work piece;

(f) The machine tool may be loaded with work pieces at a station at one end of the machine, and the finished work pieces removed at an unloading station at the opposite end of the machine;

(g) The machine tool units operate upon the work piece simultaneously from a plurality of directions;

(h) Each machine tool unit operates upon more than one work piece at a time;

(i) The conveying and indexing means operates to move the work pieces a distance less than that between the centers of the machine tool unit;

(j) Each machine tool unit is capable of simultaneously performing similar operations upon a plurality of work pieces;

(k) Locating and clamping means for a plurality of work pieces are simultaneously operated from a common source of power;

(l) The operation of the conveying means is controlled by a rotary limit switch which determines the operative stroke of the conveying and indexing means;

(m) Improved means are provided for reciprocating the conveying and indexing means; and, (n) The entire machine tool, including the large number of individual machine tool units, is controlled by a single operator from adjacent the loading station.

A further object is to provide an improved machine tool which is capable of performing a large number of machining operations upon a work piece in a relatively short period of time.

Other objects will appear from the following description, reference being had to the accompanying drawings, in which.

Figure 1:
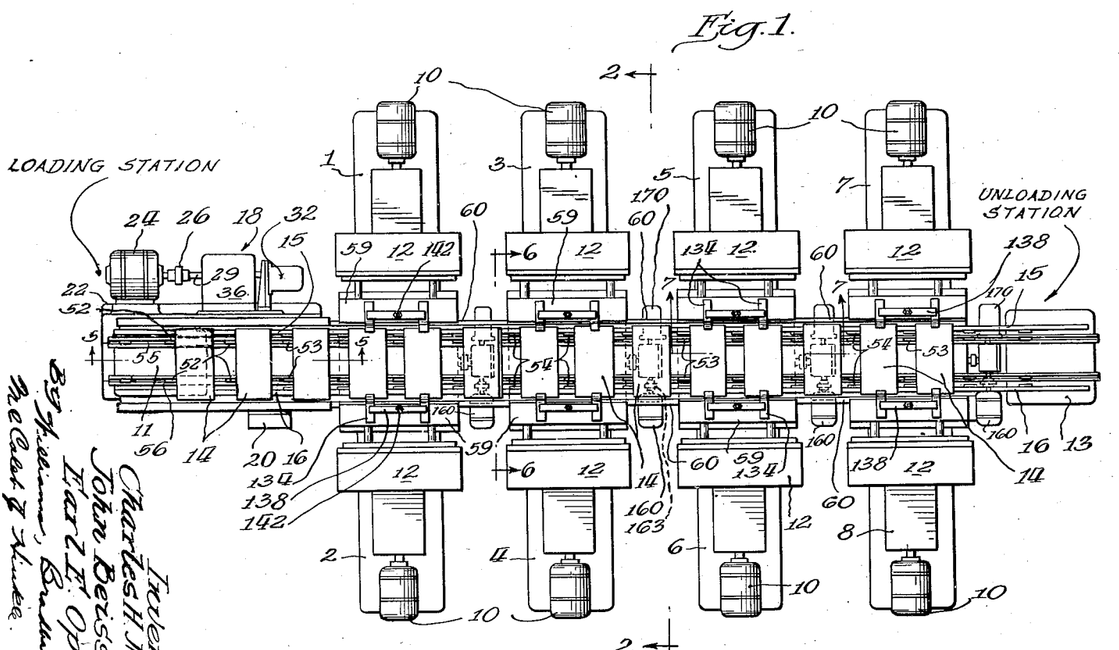
Figure 1 is a plan view of the complete machine tool.
Figure 2:
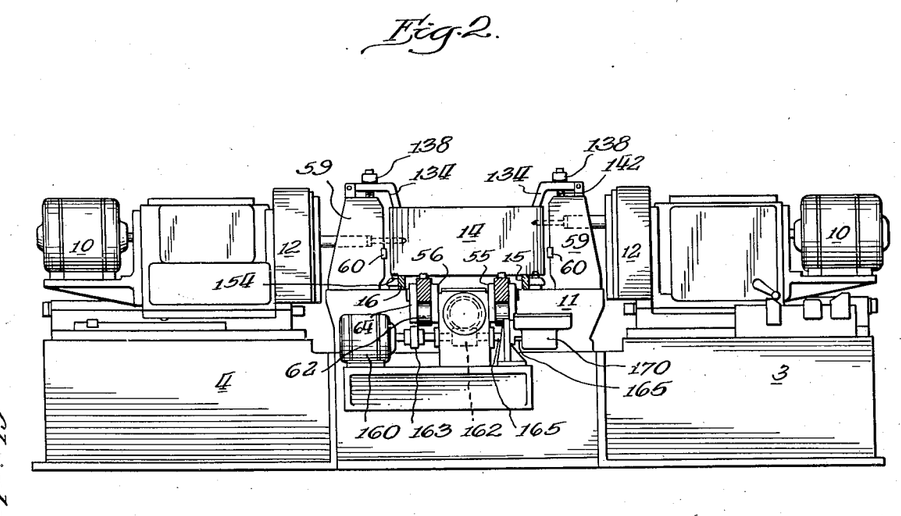
Figure 2 is a transverse sectional view thereof, taken on the line 2—2 of Figure 1.

Referring to Fig. 1, the machine comprises a plurality of machine tool units 1 to 8, inclusive, each of which includes a driving motor 10, a reciprocable head 12 carrying a plurality of spindles which are driven by the motor 10 and each unit, including a hydraulic feed, together with the necessary cams, valves, and other controls, by which the head 12 is caused to go through a cycle consisting of a rapid forward traverse, forward feed, reverse feed (for tapping operations) and a rapid reverse traverse. Each of these units has its tools, cams, and controls set to perform certain machining operations, depending upon the nature of the operations to be the work piece, and is so conditioned that upon initiation of its cycle of operation it will, in the absence of accidental irregularities, go through a complete cycle of operations independently of the other units, and will come to rest upon the completion of its cycle of operations.

These units may be of the type and construction disclosed in greater detail in the patent to R. A. Schafer, No. 2,108,297, and Schafer et al. No. 2,108,779, to which reference may be had for the details of their construction and operation, the invention herein disclosed being an improvement on the multiple machine tool disclosed in the latter patent. Except as hereinafter described, these units will operate in the manner disclosed in the aforesaid patents, the exception being that all of the units are interlocked with the indexing mechanism and the work piece locating and clamping mechanisms, so that the cycles of the different units cannot be initiated until the work pieces have been located and clamped in proper position between the machine tool units which are to operate upon it.

It will be noted that the units 1 to 8 are located in a line of pairs, the units of a pair being in alignment for simultaneous operation upon opposite ends of the work piece, and each pair having their bases secured to a connecting frame casting 11 which maintains the units in exact alignment.

The work pieces, which may be cylinder blocks for internal combustion engines, or similar castings or forgings to be machined, are indicated in the drawings as blocks 14 and are shown as resting upon a pair of rails 15, 16. These rails are supported on the castings 11, and extend substantially the full length of the machine.

The machine includes an indexing mechanism designated generally by the reference character 18 located adjacent the loading station, and adjacent the loading station there is provided a control panel 20 which has the necessary push button operated switches, to be described hereinafter, by which the operator may control the operation of the machine as a whole.

Figure 3:
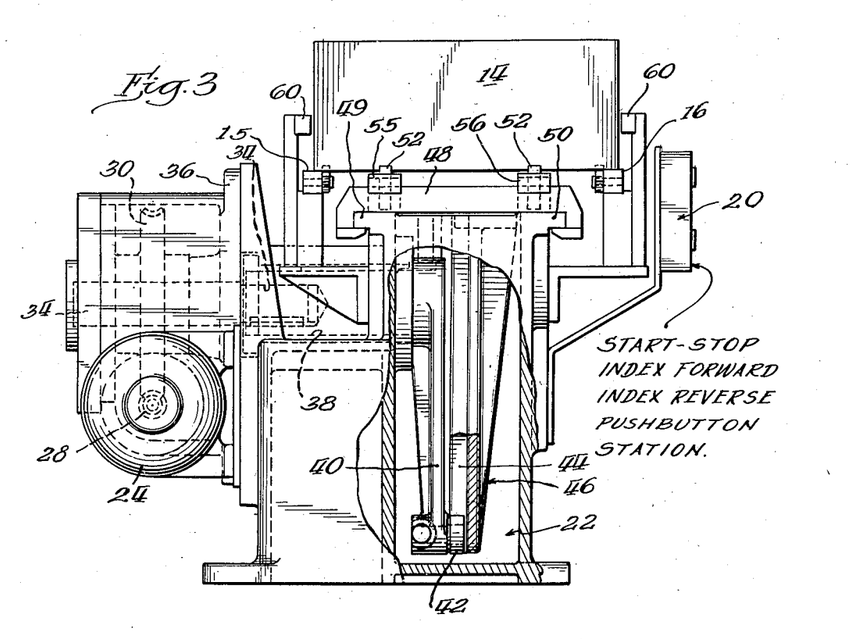
Figure 3 is an end elevational view of the index mechanism.
Figure 4:
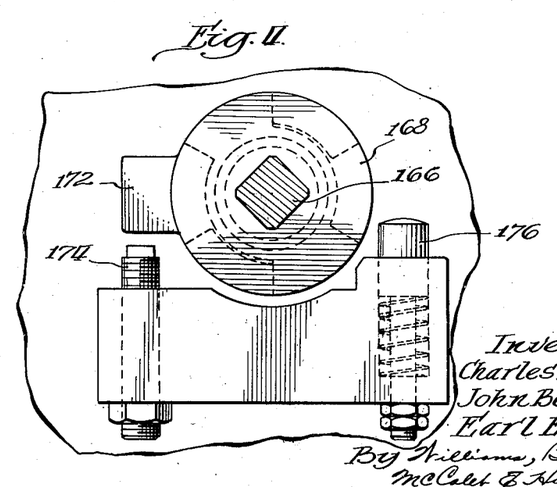
Figure 4 is a transverse sectional view of the lost motion coupling and stops of the locating and clamping mechanism taken on the line 4—4 of Figure 7.
Figure 5:
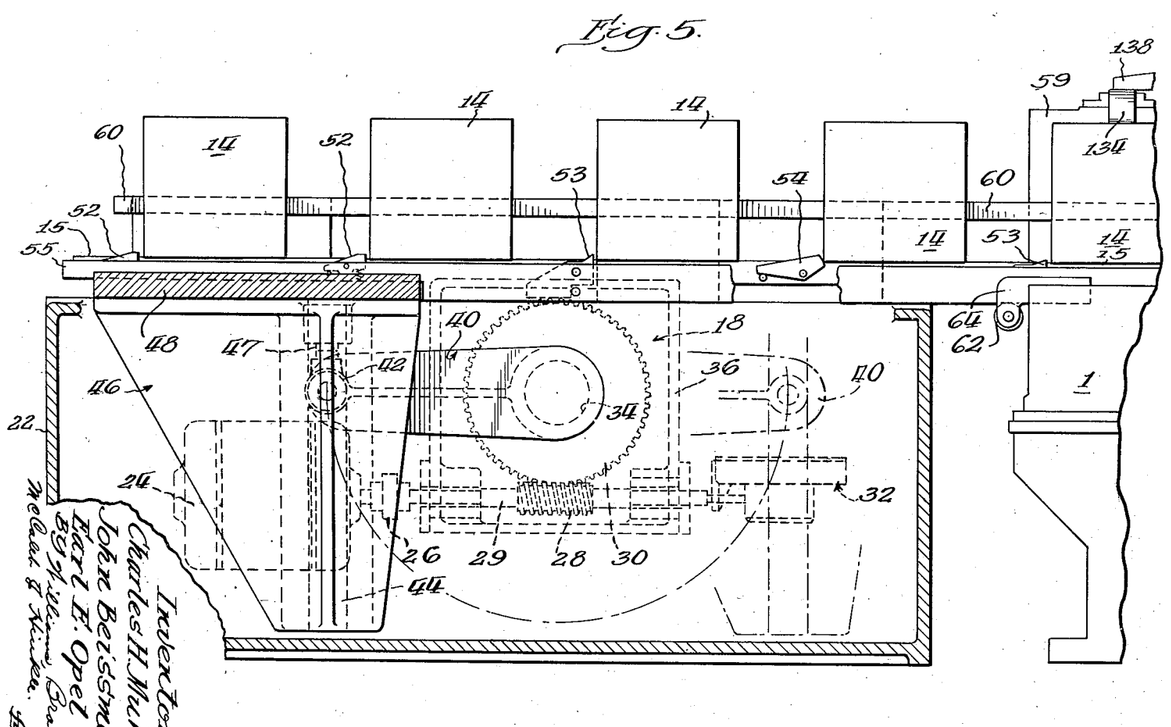
Figure 5 is a longitudinal sectional view of the indexing mechanism taken on the line 5—5 of Figure 1.

Referring more particularly to Figs. 3 and 5, the indexing mechanism is mounted upon a pedestal 22 and comprises an electric motor 24 which, through a flexible coupling 26, drives a worm 28 secured to a shaft 29, the worm being in mesh with a worm gear 30. A rotary limit switch designated generally 32, is driven from the shaft 29, as will hereinafter be described in greater detail. The worm gear 30 is mounted upon a shaft 34, which shaft is supported in suitable bearings formed in a bracket and housing casting 36, which is secured to a pedestal 22, the shaft 34 being keyed to a shaft 38 which carries a crank arm 40. The end of the crank arm 40 carries a roller 42 which operates in a slot or track 44 formed in a bracket 46, which depends from a slide 48. The travel of the crank 40 and bracket 46 is indicated in Fig. 5 by showing these parts in full lines at one end of the stroke of the crank arm and in dotted lines at the other end of the stroke.

The return stroke of the crank arm is limited by an adjustable stop 47, which may be in the form of a headed stud threaded in the slide 48 at the end of the track 44. The slide 48 is guided upon ways or rails 49, 50, and has a pair of indexing rails 55, 56 secured thereto. Each of these indexing rails is composed of a pair of spaced bars extending the full length of the machine, between which bars are pawls 52 located near the extremities of indexing rails 55, 56 at the loading station. These pawls 52 are spring pressed so as normally to project above the upper surface of the indexing rails 55, 56 and above the level of the top surfaces of rest rails 15, which are rigidly secured to the pedestal 22. The indexing rails also carry a series of pawls 53 spaced along the length of these rails. The rest rails 15 carry gravity actuated stop pawls 54, as indicated in Fig. 5. Also secured to the pedestal 22, and to tool guide and work clamping frame brackets 59, and extending the full length of the machine are a pair of guide rails 60. The frame brackets 59 are secured to the connecting frame castings 11.

The indexing rails 55, 56, likewise extend throughout the full length of the machine, and are thus capable of advancing the blocks 14 from the loading station successively along the rest rails 15 between the rows of machine tool units to the unloading station, by virtue of the fact that the indexing rails 55, 56, are provided with the indexing pawls 52, 53, while the rest rails 15, 16, are similarly provided with the stop pawls 54, these latter pawls being effective to prevent retraction of blocks 14 after they have been advanced to properly spaced positions along the rest rails by the indexing pawls 52, 53.

In the operation of the indexing mechanism above described, the motor 24 swings the crank arm 40 from full line to dotted line position, whereupon the slide 48 and the indexing rails 55, 56 are moved forwardly (to the right, Fig. 5) a distance slightly greater than that represented by the distance between alternate pairs of pawls 54 or 53. Thus, upon each forward movement of the indexing rails 55, 56, two blocks (at the loading station) will be advanced into the machine between units 1 and 2, and similarly two blocks will be advanced from between units 7 and 8, to the unloading station, where they may be removed by the machine attendant. The intermediate blocks will, of course, be correspondingly advanced. Upon the return swinging movement of the crank arm 40 from the dotted line to the full line position of Fig. 5, the blocks 14 are held against return movement by the pawls 54. The pawls 52 and 53, being held in elevated position by springs, may pass beneath the blocks held by pawls 54 without disturbing the positions of the latter. At suitable intervals along their length, the indexing rails 55, 56, are guided for rectilinear movement, the rails being supported by a plurality of rollers 62 carried by brackets 64 secured to the connecting frame castings 11, and on the pedestal 13 at the unloading station.

It will be noted from Fig. 1 that the machine tool units 1, 3, 5 and 7, and 2, 4, 6 and 8 are spaced along the rest rails and indexing rails a distance greater than twice the distance between successive pawls 54. For example, the pawls 54 may be spaced 18 inches apart, whereas the machine tool units are spaced 54 inches apart. Under these circumstances, the crank arm 40 may have a stroke of 36.5 inches, thus advancing the blocks 14 a distance of 36 inches along the rest rails 15 upon each forward stroke. On the return stroke, the pawls 52, 53 will move ½ inch past the blocks 14, so as to assure operation of these pawls to positions in which they may engage the blocks upon the next forward stroke of the crank arm.

This arrangement has the result that two adjacent castings are operated upon by different sets of tools of the various units 1 to 8. For example, designating 4 adjacent blocks as A, B, C and D, placed upon the indexing rails at the loading station, upon the first indexing movement, blocks A and B would be placed in position to be operated upon by units 1 and 2. Since both blocks require the same operations to be performed upon them, each of the units will have two similar sets of tools, one set of each unit operating upon the block A, while the other set of each unit is operating upon block B.

After completion of the second indexing operation, block A will be advanced to a position where it can be operated upon by units 3 and 4, whereas block B will lie in an idle position intermediate the units 1, 2 and units 3, 4. At the same time, blocks C and D will have been advanced to positions in which they may be operated upon by the units 1 and 2.

Upon completion of a third indexing operation, block A will have been advanced to an idle position between units 3, 4 and units 5, 6, and will not be operated upon, whereas blocks B and C will have been advanced to positions where they may be operated upon by units 3 and 4, while block D will be in an idle position between units 1, 2 and units 3, 4. In this way, the blocks will progress through the machine, each block being machined in two successive positions to which it is indexed, and being idle in the third successive position to which it is indexed. Thus, of the eleven blocks which are on the machine (exclusive of those which may be placed upon the indexing rails of the loading station and those which may not have been removed from the indexing rails at the unloading station), eight of the blocks will be having machining operations performed upon them, while three of the blocks are in idle positions.

Figure 9:
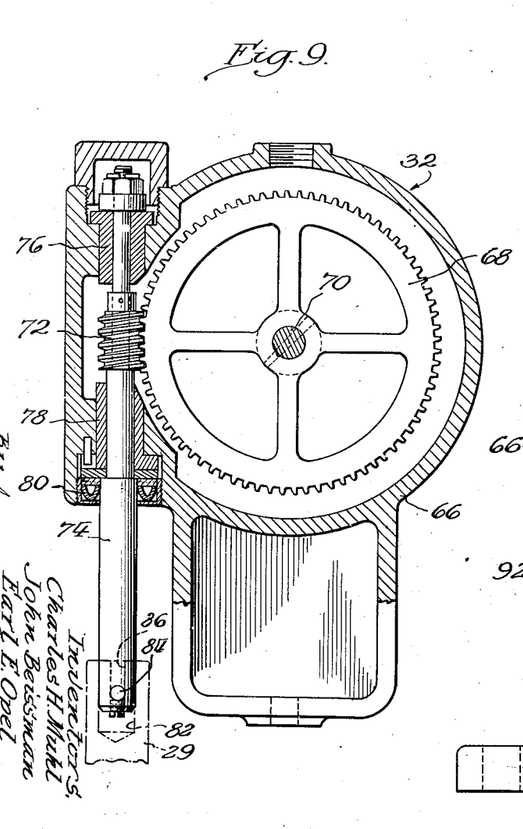
Figure 9 is a horizontal sectional view of the rotary limits switch used to control the operation of the indexing mechanism.
Figure 10:
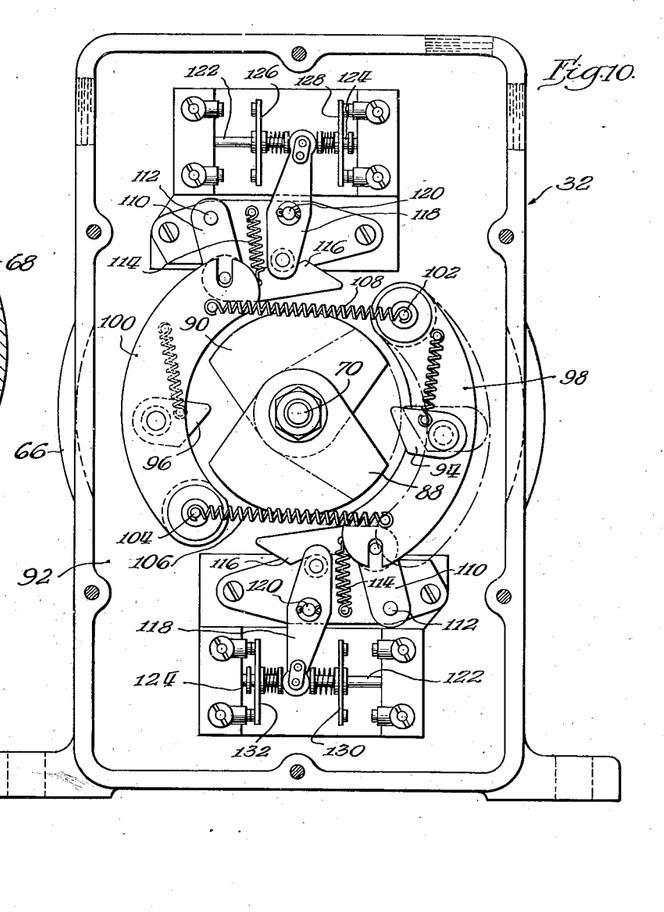
Figure 10 is a view similar to Figure 9, showing the parts located above those shown in Figure 9.

The rotary limit switch 32 is shown in detail in Figs. 9 and 10, and as previously stated, is driven from the shaft 29, thus operating in synchronism with and controlling the operation of the indexing mechanism. The rotary limit switch 32 comprises a housing 66, the lower portion of which forms a lubricant-tight enclosure for a worm gear 68 (Fig. 9) which is pinned to a suitably journaled shaft 70. The worm gear 68 is driven by a worm 72 pinned to a shaft 74 which is mounted in suitable bearing bushings 76, 78, and which is provided with an oil seal ring 80. The outer end of the shaft 74 projects into a socket 82 formed in the end of the shaft 29, a pin 84 projecting through the shaft 74 and into slots 86 in the shaft 29, forms a driving connection between the shaft 29 and the shaft 74 permitting slight universal movement between these shafts so as to make it unnecessary to have the shafts in absolutely correct alignment. Dogs 88 and 90, non-rotatably secured to the shaft 70 are located on the upper side of a dividing web 92 with respect to the position of the worm gear 68, the shaft 70 projecting through this web and being surrounded by a suitable oil seal to prevent lubricant flow past the shaft into the portion of the casing which contains the switches and their operating mechanism, as shown in Fig. 10. The dogs 88 and 90 are in alignment with spring actuated wipe pawls 94 and 96, respectively, which are pivoted to switch actuating levers 98 and 100, respectively. These levers 98 and 100 are pivoted on pins 102, 104, respectively, and are urged clockwise by springs 106 and 108 respectively. The lever 100 has a pin and slot connection with a bell-crank 110 pivoted to a stationary pin 112, the bell-crank being urged to swing in a counter-clockwise direction by a tension spring 114. The free arm of the bell-crank 110 has a cam 116 formed thereon for engagement with a roller carried by a lever 118 which is pivoted on a fixed pin 120. The other end of the lever 118 is engageable with the heads of actuating stems 122, 124 for the alternate operation of switches 126, 128.

The lever 98 is connected through a linkage similar to that previously described so as to be capable of alternately closing switches 130 and 132. The parts of this linkage which correspond to the parts of the linkage operated by the lever 100 have therefore been designated by similar reference characters in Fig. 10.

The reduction gear ratio between the worm 28 and its worm gear 30 is practically the same as that between the worm 72 and its worm gear 68, and as a result shaft 70 will make approximately one-half of a revolution in a clockwise direction as the crank arm 40 moves counter-clockwise (Fig. 9) from its full line to its dotted line position shown in Fig. 5. Both worms 28 and 72 are right-hand, so that the dogs 88 and 90 will rotate in a clockwise direction. As the crank arm 40 approaches the position shown in dotted lines in Fig. 5, the dog 90 will engage the pawl 96, and through the bell-crank 110 and the lever 118 operate to close the switch 126 and open the switch 128. The operation of these switches, as will appear hereinafter in connection with the description of the wiring diagram, Fig. 8, results in de-energizing the indexing motor 24 and applying the magnetic brake thereto. It will be understood that the motor 24 is of the type which includes a built-in brake which consists of a solenoid holding the brake released when the solenoid is energized. A spring applies the brake to the motor when the solenoid is de-energized, and since the solenoid is wired in parallel with the motor winding, the brake will be applied by the spring at the same time that the motor winding is de-energized. The operation of the switches 126, 128, in addition to stopping the indexing motor 24, indicates that the blocks 14 are in position for locating and clamping, and serves as a means to control the initiation of the latter operations, as will appear hereinafter.

When all of the heads of the units 1 to 8 have left their back positions and moved toward the work for performing the machining operations thereupon, their interlocking switches cause the index motor 24 to run in a reverse direction, with the result that the crank arm 40 will swing in a clockwise direction to the position shown in full lines in Fig. 5, in which position it will be arrested by the stop pin 47. This stop thus prevents any possible over-travel of the indexing crank arm 40. If such over-travel were permitted, the indexing rails 55, 56 would start upon an undesired indexing operation. As the crank arm 40 approaches its full line position (Fig. 5), the limit switch shaft 70 turns counter-clockwise and engages the pawl 94 and thereby through the linkage connecting the lever 96 closing switch 130 and opening switch 132. As will appear more clearly from the wiring diagram of Fig. 8, and the description of this diagram, the operation of switches 130 and 132 will stop the indexing motor 24 when the crank arm 40 reaches the stop 47 and will apply the previously mentioned solenoid actuated brake to the motor.

Each pair of machine units 1 to 8 have their bases rigidly interconnected by a connecting frame casting 11 and upon this casting is mounted the locating and clamping mechanism for the work pieces 14, it being understood that there is a unitary locating and clamping mechanism for each pair of the machine tool units 1 to 8. Referring to Figs. 2, 4, 6 and 7, the clamping mechanism consists of the upright brackets 59 which carry the guide bushings for the drills and other tools, and upon which are pivotally mounted clamps 134 which are normally urged to releasing position by return springs 136, and are adapted to be swung downwardly into engagement with the top of the blocks 14 by equalizer beams 138 which are pulled downwardly against the compression of springs 140 by pull rods 142 which extend through over-size holes formed in the equalizer beams 138 so as to permit slight rocking movement of the equalizer beams 138 with respect to their pull rods 142. The lower ends of the pull rods 142 extend through suitable slightly over-size holes formed in the ends of a lower equalizing beam 144 so as to be capable of slight universal movement with respect thereto. The lower equalizing beam 144 is adapted to be moved downwardly by a cam 146 secured to a shaft 148, thereby drawing the clamps 134 into firm engagement with the blocks 14, due to the double whiffletree action of the equalizing beams 144 and 138. The shaft 148 also carries two eccentrics 150 which operate locating pin equalizer beams 152. Locating pins 154 are suitably guided in bushings 156 mounted in a sub-base 158. The sub-base is, of course, mounted upon the connecting frame casting 11, and the locating pins 154 are connected to the ends of the equalizer beam 152 by a pin and slot connection. The cam shaft 148 is driven by a motor 160, which is connected to a worm 162 through a flexible coupling 163, the worm being mounted upon or formed on a shaft 165. The worm drives a worm wheel 164 which is keyed to a stub shaft 166, the latter being connected to the cam shaft 148 by a flexible coupling 168. The shaft 165 operates a rotary limit switch 170 which may be of the same construction as shown in Figs. 9 and 10. Rotary motion of the shaft 148 in a counter-clockwise direction (Fig. 4) is limited by engagement of a stop arm 172 with the end of an adjustable stop screw 174, and its movement in the clockwise direction is limited by a resiliently mounted stop pin 176. The movable stop arm 172 may conveniently be formed as an integral part of the half of the flexible coupling 168 which is secured to the squared end of the shaft 148.

Figure 6:
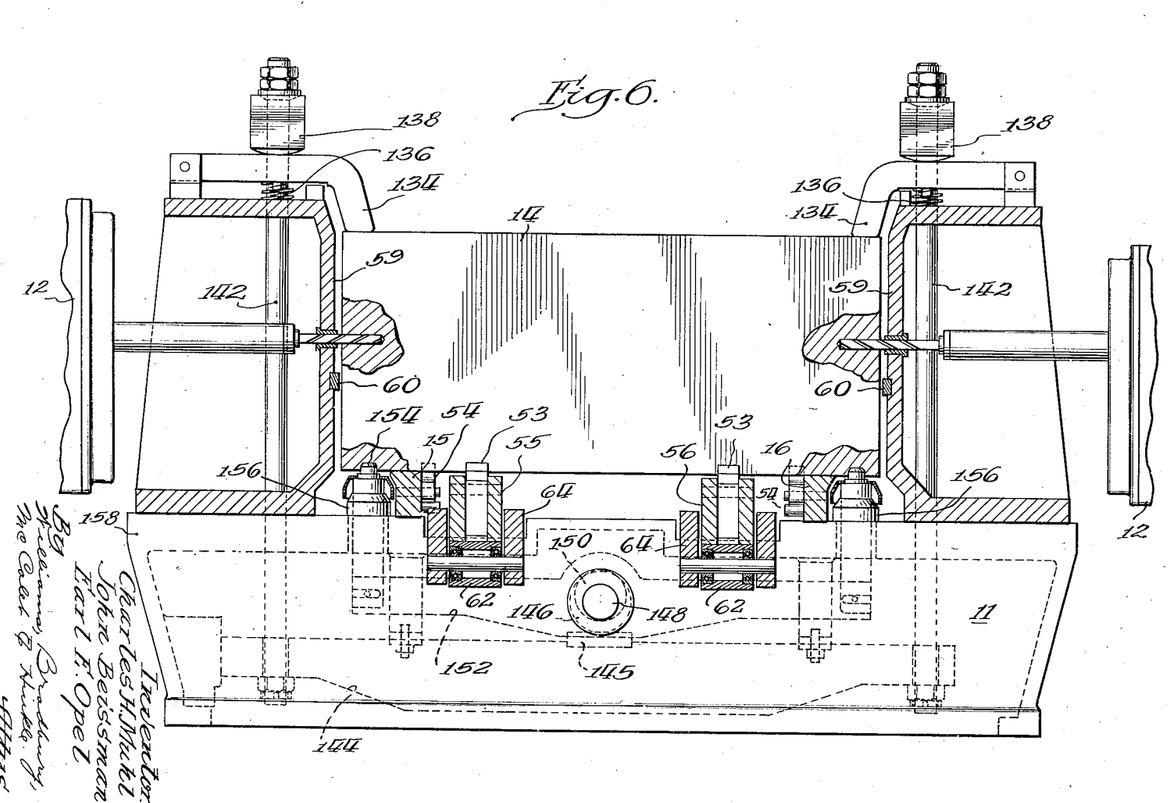
Figure 6 is a transverse sectional view taken on the line 6—6 of Figure 1.
Figure 7:
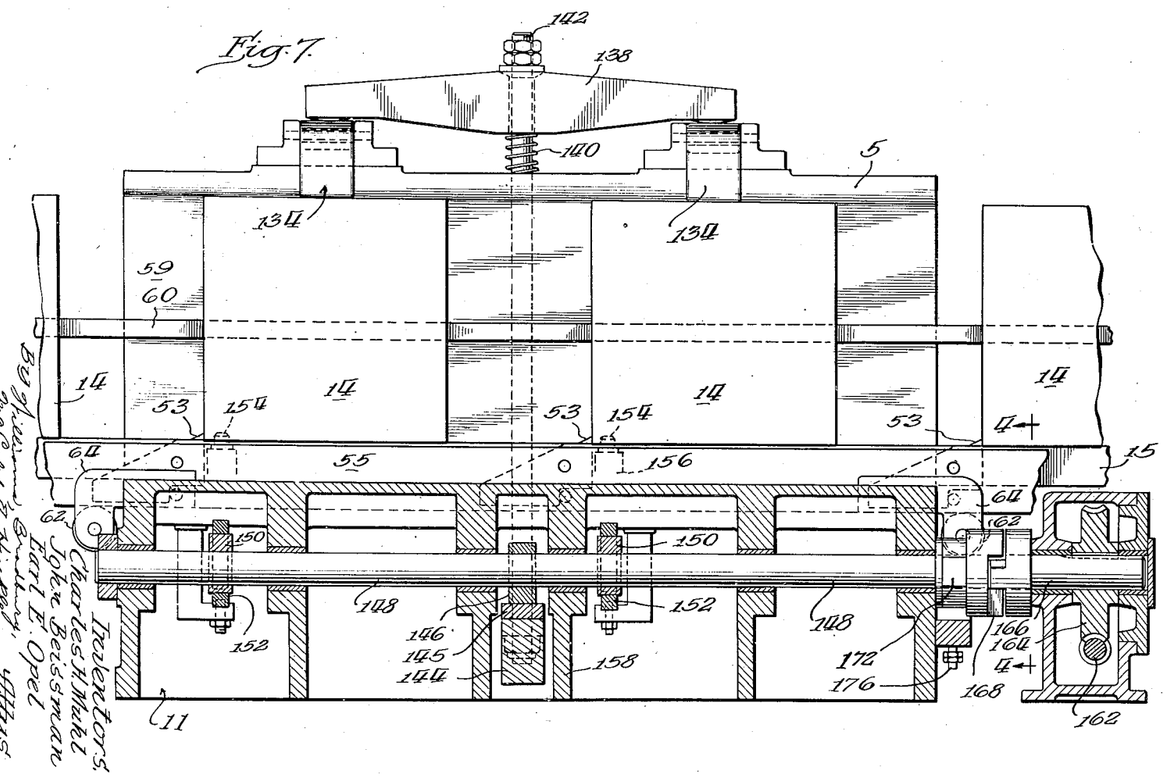
Figure 7 is a central longitudinal sectional view taken on the line 7—7 of Figure 1.

The cylinder blocks or other pieces to be machined are each provided with a pair of locating holes for the reception of the locating pins 154. Thus, after an indexing operation has been completed, the motors 160 are energized and rotate their associate cam shafts 148 in a clockwise direction (Fig. 6). Thus the cams 146 force their associate equalizer beams 144 downwardly and through the pull rods 142 and upper equalizer beams 138 bring the clamps 134 into clamping engagement with the blocks 14. At the same time, the locating pin equalizer beams 152 are raised so as to bring their bullet-nosed equalizer pins into engagement with the locating holes formed in the cylinder blocks, and thus accurately locate the blocks in proper positions for the machining operations. The angle of the rise on cam 146 is such that a locking action of the clamps 134 takes place as the cam shaft 148 reaches the end of its clockwise (Fig. 6) movement. In the event that there is no block 14 beneath one of the clamps 134, the stop arm 172 will be effective to limit the clockwise rotary movement of the shaft 148, whereas the spring cushioned stop pin 176 absorbs the shock of stopping the motor 160 when the clamps are released. The cam shaft 148 rotates back and forth through an angle of 180° during the normal operation of the clamping mechanism, but the coupling 168 provides a lost motion of approximately 60° so that the stub shaft 166 will normally oscillate through an angle of approximately 240°. The lost motion provided by the coupling 168 permits the motor 160 to accelerate under practically no load conditions, so that when the lost motion is taken up, the torque of the motor will be applied to the cam shaft with a shock effect, thereby to insure the rotation of the shaft 148, since the latter requires the application of a large starting torque to overcome the static friction between the cam 146 and the cooperating follower plate 145 carried by the lower equalizer beam 144. After the motor 160 has drawn the clamps 134 into firm engagement with the work and has elevated the locating pins 154 so as accurately to position the work, the limit switch 170 is operated to deenergize the motor 160 and to complete circuits which are effective to initiate the rapid forward traverse of the tool carrying heads of the units 1 to 8. When the machining operations of all of the units have been completed, and their heads have been retracted to normal position, the motors 160 are energized to operate in a reverse direction, thereby releasing the clamps 134 which are raised from contact with the work by their springs 136, and lowering the locating pins 154. Upon completion of these operations, the rotary limit switches 170 will again be operated to de-energize their associated motors 160, and when all of the limit switches 170 have been operated in this manner, they are effective to control the initiation of the ensuing operation of the indexing mechanism.

Figure 8:
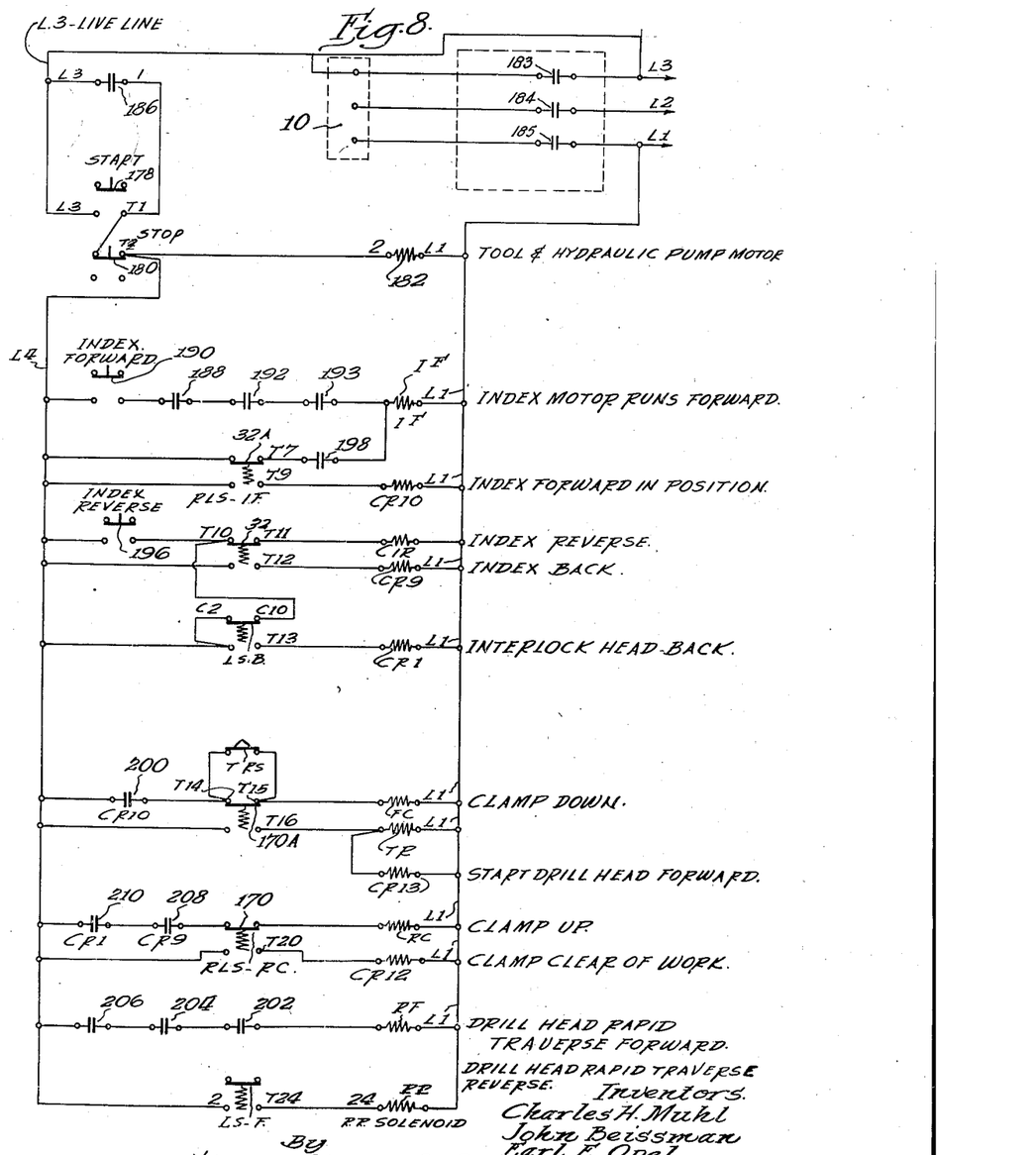
Figure 8 is a simplifier wiring diagram of the complete machine.

In Fig. 8 are shown representative portions of the wiring diagram of the electric controlling and interlocking circuits which determine the sequence of operations of the various parts of the complete machine. The diagram shows the circuits for the operation of only one of the units 1 to 8, it being understood that the eight units are interconnected with such of their various control switches in series so that the completion of the cycles of operation of all of the units will be the controlling factor, whereas in the accompanying diagram the completion of the operating cycle of only one of the units is indicated as having a controlling effect upon the remaining parts of the complete machine. The wiring diagram will be described in conjunction with a description of the sequence of operations of its elements.

Referring to Fig. 8, current is supplied to the machine through power lines L1, L2 and L3. Upon pressing a push button starting switch 178, a circuit is completed from the line L3 through the push button switch, terminal T1, normally closed stop switch 180, terminal T2, through the winding 182 of a relay to line L1. The energization of relay winding 182 causes closure of switches 183, 184, 185 and 186, the first three of these switches completing the three wire circuit to the motor 10. It will, of course, be understood that the motors 10 of all of the units 1 to 8 will be similarly energized, and that these motors are effective to maintain the required hydraulic pressure for the operation of the individual hydraulic portions of the controls and traversing means of these units. The closure of the switch 186 results in the establishment of a holding circuit for maintaining energization relay winding 182, and this holding circuit remains completed until the stop switch 180 is opened. The stop switch 180 is operated whenever it is desired to stop the machine at the completion of a day's operation, or upon any emergency, due to breakage of tools, etc. It will be understood that pressing the stop button to open the stop switch 180 results in de-energization of the relay winding 182 and consequent opening of switches 183 to 186. Closure of the switch 186 also completes the circuit to a bus L4 which is connected to the terminal T2.

In order to start the index motor 24 to initiate a forward indexing movement of the indexing rails 55, 56, the heads of the units 1 to 8 must be in retracted position, the clamps 134 must be in raised position, the locating pins 154 must be in lowered position, and the indexing rails 55, 56 must be in retracted (starting) position, otherwise the depression of the "index-forward" push-button will not be effective to cause the completion of a power supply circuit to the indexing motor 24.

When the head of the unit 1 (representative of units 1 to 8) is in its retracted or back position, a limit switch LS—B is closed to complete circuit from bus L4 to a contactor terminal T13 through the coil winding of control relay CR1. The energization of the coil of relay CR1 results in the closure of switch 188, which is in a series circuit between bus L4 and line L1 and includes the index-forward push-button switch 190, switches 192 and 193, and the coil IF of a relay which operates switches to energize the appropriate windings of motor 24 in a direction to cause a forward indexing half-cycle.

When the clamps 134 are in released position, free from the blocks 14, the rotary limit switch 170 completes a circuit between bus L4, terminal T20, through the winding of a control relay CR12 to line L1. This relay closes switch 192.

When the indexing rails 55, 56 are in retracted or loading position, rotary limit switch 32 is in a position completing a circuit from the bus L4 through terminal T12 and control relay CR9 to line L1. Energization of the winding of relay CR9 results in closure of the switch 193, thus enabling the completion of the interlock circuit when the "Index-Forward" push-button is depressed, this circuit being traced as follows: L4, 190, 188, 192, 193, IF, L1. When this circuit is completed, the indexing motor 24 rotates in a direction so as to swing its crank arm 40 counter-clockwise from the full line position to the dotted line position (Fig. 5), and when in the latter position, the rotary limit switch 32 will be operated to open the circuit from L4 to terminal T12, with the result that relay CR9 is de-energized and switch 193 is opened, so that the circuit to the motor 24 is interrupted. At the same time, the switch 32 closes a circuit across terminals T10 and T11, which circuit includes an index reverse switch 196 and the winding IR of index motor reversing magnetic switch or relay.

In addition to starting the indexing motor 24, the energization of the coil of relay IF results in the closure of a switch 198, establishing a holding circuit for the winding of relay IF, this circuit shunting the switches 190, 188, 192 and 193, and including in this shunt circuit the rotary limit switch 32A, which completes the holding circuit from bus L4 through terminal T7, switch 198 and coil of relay IF to line L1. This holding circuit is required to make unnecessary that the push-button switch 190 be held closed during the forward indexing operation and also because the switch 193 may be opened by the relay CR9 prior to completion of the forward indexing operation.

The control relay CR9 is de-energized when the rotary limit switch 32 re-sets itself for the reverse travel of the indexing rails 55, 56 by interconnecting the contactor terminals T10 and T11. At the same time the connection between the bus L4 and T12 is opened, and relay CR9 de-energized, resulting in the opening of switch 193 and the transfer of the circuit through the forward windings of the motor 24 to the holding circuit previously described.

Upon completion of the forward indexing movement of the indexing rails 55, 56, the rotary limit switch 32A breaks the circuit between bus L4 and terminal T7, and thus de-energizes the winding IF of the relay which controls the forward indexing rotation of motor 24. The switch 32A at the same time completes a circuit from bus L4 to a terminal T9 which is connected to one end of the winding of a relay CR10, the other end of the winding being connected to line L1.

The operation of the relay CR10 results in the closure of a switch 200 which completes a circuit to a terminal T14 through a switch part 170A which is incorporated in the rotary limit switch 170. From the switch part 170A, the circuit is completed through terminal T15 and winding of a relay FC to line L1. The relay or magnetic switch FC operates switches which complete the circuit to the forward rotation terminals of motor 160. After the motor 160 has caused the location of the block 14 by means of the locating pins 154 and has clamped the block 14 against the rest rails 15, 16, by means of the clamps 134, the rotary limit switch 170 again operates to move the switch part 170A away from terminals T14 and T15, but the supply of current to the relay winding FC is continued through the timing relay operated switch TRS which connects terminal T14 with terminal T15 and is influenced by the timing relay coil TR.

After a pre-determined time delay, the switch TRS opens and thus the supply of current to the winding of the magnetic switch FC is interrupted. The purpose of this time delay is to make certain that the blocks have been tightly clamped. Part of the rotary limit switch 170, represented by the reference character 170A in Fig. 8 upon moving to break the circuit between T14 and T15, may be considered as completing a circuit from bus L4 to terminal T16, which results in the energization of a control relay CR13.

Control relay CR13 closes a switch 202 which, together with switches 204 and 206, is in series with the winding RF which is located on the machine unit 1 and operates the hydraulic valve mechanism to initiate forward traversing movement of the drill head thereof. In order that the circuit through the winding of relay RF may be completed, it is necessary that in addition to the closure of switch 202 controlled by the relay CR13, the switches 204 and 206 must be closed. Switch 204 is closed upon the energization of relay winding CR10, whereas switch 206 is closed upon energization of the relay winding CR1. Thus forward traversing movement of the head of the unit 1 cannot commence until the head is in its retracted position, the indexing mechanism has completed its forward indexing operation, and the locating pins 154 and clamps 134 have been operated to hold the work in position.

By the usual suitable control dog on the head of the unit 1, a limit switch LS—F is operated to complete a circuit between the bus L4 and terminal T24, as soon as the rapid forward-feed forward operations of the head have been completed. Such operation of the switch LS—F energizes the coil RR of the solenoid which, when operated, conditions the unit 1 for rapid-reverse movement, so as to retract the head to its normal back position, with the tools withdrawn from the work, in which position the head comes to rest.

When the head goes forward from the interlock limit switch LS—B, a dog on the head operates this limit switch to connect contacts C2 and C10, as shown. This completes the circuit to the winding IR of the magnetic reversing switch relay controlling the energization of the reverse terminals of indexing motor 24. The reverse rotation of the indexing motor 24 causes clockwise swinging movement of the crank arm 40, thus retracting the indexing rails 55, 56 to loading position, whereupon the attendant may place additional blocks 14 upon the indexing rails. The time afforded for reloading is thus determined by the length of time required for the completion of the cycles of operation of all of the units 1 to 8.

When the indexing rails 55, 56 reach the loading position, the rotary limit switch 32 opens contacts T10—T11, thus de-energizing winding IR and stopping the indexing motor 24. The switch 32 at this time also completes a circuit from the bus L4 to terminal T12 and hence energizes the control relay CR9. Energization of relay CR9 closes a switch 208 which is in series with switch 210 (operated by control relay CR1), the switch 170, and the winding RC of a magnetic starter switch. The latter switch causes the completion of circuits which energize the motor 160 in a reverse direction to cause release of the clamps 134 and removal of the locating pins 154 from the work. It will be understood, however, that since the switch 210 is operated by the relay CR1, which in turn is energized only when all of the heads have returned to their normal or retracted position, the motor 160 will not be operated to release the clamps until all of the units 1 to 8 have completed their operating cycles. When the clamps have been released, the rotary limit switch 170 is operated to open the circuit through the winding RC and to close a circuit from the bus L4 to terminal T20 which is in a circuit including the winding CR12. Energization of the winding of the control relay CR12 closes switch 192, thereby conditioning the electrical system for a new cycle, which, of course, is initiated by the operator by closing the index forward switch 190.

From the foregoing description of the electrical control circuits of the machine, it will be apparent that the operations take place in the following order:

(1) Closure of the start switch 178 results in energizing the motors 10 of the various units 1 to 8 so that these units are in condition for operation, and the controlling circuits to maintain such energization are held by the closed switch 186.

(2) After the attendant has loaded a pair of blocks 14 upon the indexing rails 55, 56, he operates the index forward switch 190. Assuming (a) that the switch 188 is closed, because all of the heads of the units 1 to 8 are in their retracted position, (b) that the switch 192 is closed due to the fact that the clamps 134 and locating pins 154 are clear of the work, and further (c) that switch 193 is closed because the indexing rails are in loading position, the closure of switch 190 will cause the indexing motor to operate in a forward direction and advance the blocks into the machine.

(3) Upon completion of the indexing operation, the clamp and locating pin operating motors 160 are operated to locate and hold the work accurately in position to be operated upon by the various units.

(4) After the clamping and locating operations have been completed, the heads of the units 1 to 8 move forward for rapid traverse and forward feed to perform their respective operations upon the work piece.

(5) Just after the commencement of the operating cycles of all of the units 1 to 8, the indexing motor 24 is energized to rotate in a reverse direction and thus retract the indexing rails 55, 56 to loading position.

(6) When the units 1 to 8 have completed their operations and all of their heads have been returned to their normal withdrawn position, the various locating and clamp operating motors 160 are operated in a reverse direction to remove the locating pins and to free the clamps from the work, and upon completion of these operations, the machine is again in condition to start upon a new cycle of operations by the closure of the index-forward switch 190.

It will be recognized from the above description that we have provided a multi-unit machine tool in which it is unnecessary to provide special jigs or fixtures for the work pieces, but instead the work pieces, such as cylinder block castings, are handled by the machine without any such attachments, it being necessary to provide only two or more locating surfaces for engagement with the rest rails 15, 16, and two holes for cooperation with the locating pins 154. The elimination of the necessity of clamping fixtures or jigs to the work pieces results in a great saving of time and effort in the loading and unloading of the machine.

The indexing means is comparatively simple in construction, and is so arranged that the load upon its driving motor is at the minimum during starting and stopping, and that the indexing rails have simple harmonic motion both during their forward and return strokes. The rotary limit switch is connected with the index rail operating means so as to move in synchronism therewith, and thus forms a compact separable unit for the control of the indexing motor and the interlocking circuits.

The utilization of a single locating and clamping mechanism for each pair of the units results in efficient operation of the complete machine, since the complexities which would be inherent in endeavoring to provide for this purpose a mechanism common to all of the units are avoided. Furthermore, this arrangement of and method of operation of the locating and clamping mechanisms makes it feasible to readily build up a machine with any required number of units, since each locating and clamping mechanism is operated independently of the others, except for the interlocking electrical control circuits. The particular construction of the locating and clamping mechanism also presents material advantages derived particularly from the use of the lost motion driving connection between the clamping motor 160 and the cam shaft 148, by virtue of which the work may be very firmly clamped against the rest rails 15, 16, while permitting release of the clamps by means of a motor 160 of reasonable power. The fact that the four clamps 134 which operate between a pair of the machine tool units are actuated through the equalizer beams results in the application of the same pressure by each of the four clamps, thereby assuring that the blocks 14 will be tightly clamped at both ends despite minor irregularities in their vertical dimensions at the points engaged by the clamps.

The electrical control system for the machine as a whole is so arranged with interlocks that the parts must necessarily operate in proper sequence, and so that the operation of the machine will be arrested should any part fail, through accident, properly to complete its operation.

Under normal conditions, the machine may be operated to perform all of the drilling, tapping, reaming, end facing, and similar operations, upon both ends of an internal combustion engine cylinder block, at a rate of more than ninety blocks per hour. At this rate, the attendants do not have any difficulty in loading and unloading, because of the fact that it is not necessary for them to attach jigs to the blocks, or do anything except place the blocks upon the indexing rails at the loading station, and to remove them therefrom at the unloading station.

The units 1 to 8 may be of any suitable self-contained construction in which the unit will go through its operating cycle upon operation of a suitable control switch to initiate the cycle. Units of this type are well known in the art, and are shown in application Serial No. 719,240, filed April 6, 1934.

While we have shown and described a particular form of our invention, it will be apparent to those skilled in the art that numerous modifications and variations may be made in its construction without departing from the underlying principles thereof. We therefore desire, by the following claims, to include within the scope of our invention all such similar varied and modified forms of the invention in which substantially the results of our invention may be obtained by substantially the same or equivalent means.

We claim:

1. In a machine tool having a plurality of machine tool units arranged in a row for performing successive operations upon work pieces, the combination of a pair of upwardly facing rest rails extending the length of the row of said units, reciprocable indexing rails having means for engaging work pieces and advancing them successively along said rest rails to stations adjacent said units, means for reciprocating said indexing rails, and motor operated means for clamping the work pieces against said rest rails.

2. The combination set forth in claim 1, in which said clamping means comprises a clamp, a cam for moving said clamp toward the work piece, an electric motor, and a lost motion power transmitting connection between said motor and said cam.

3. The combination set forth in claim 1, in which said clamping means comprises a pair of clamps, an equalizer beam, means connecting the ends of said equalizer beam with said clamps, respectively, a shaft, an eccentric member on said shaft for moving said beam by the application of a force to the center thereof, and means to rotate said shaft.

4. The combination set forth in claim 1, in which said clamping means comprises two pairs of clamps, a pair of equalizer beams, each having its ends connected to a pair of said clamps respectively, for operating the latter, a third equalizer beam having its ends connected to the central portions of said pair of equalizer beams respectively, a cam engageable with the central portion of said third equalizer beam, and power operated means to operate said cam.

5. The combination set forth in claim 1, in which said clamping means comprises a clamp, means for moving said clamp toward the work piece, a plurality of longitudinally slidable locating pins engageable in holes formed in the work pieces, and a motor for operating said clamps and for forcing said locating pins into holes in the work piece, thereby accurately and firmly to position the work pieces at their respective stations adjacent said units.

6. The combination set forth in claim 1, in which said clamping means comprises a clamp, means for moving said clamp into firm engagement with a work piece, locating pins movable into holes formed in the work pieces, equalizer beams, operating connections between the ends of said equalizer beams and said locating pins, and cams for applying a force to the central portions of said equalizer beams, thereby to force said locating pins into holes in the work piece.

7. The combination set forth in claim 1, in which said motor operated means for clamping the work pieces against said rest rails includes an electric motor, a limit switch for initiating the stopping of said motor, and a time delay relay operated switch controlled by said limit switch and insuring the application of electric power to said motor for a limited time after said limit switch has been operated in a manner to initiate the discontinuance of the supply of electric power to said motor.

8. An indexing mechanism for machine tools comprising a pair of indexing rails, means for supporting said rails for longitudinal movement, a slide secured to said rails, said slide having a track perpendicular to said rails, a crank having a roller engaging said track, an electric motor connected to oscillate said crank upon alternate rotation in opposite directions, a limit switch mechanism operated by said motor in synchronism with said crank, a control switch, and means conjointly operated by said mechanism and said control switch to cause said motor cyclically to move in one direction thereby to advance said rails, to stop, to move in the opposite direction thereby to retract said rails, and to stop.

9. An indexing mechanism for a multi-unit machine tool, comprising, a pair of indexing rails, a plurality of spaced pawls on said rails for engagement with work pieces, means for reciprocating said rails, upwardly facing rests adjacent said rails, clamping and locating means spaced along said rails and engageable directly with work pieces firmly to hold the latter downwardly against said rests in position to be operated upon by machine tools, and interlocking means for controlling the operation of said rail reciprocating means and said clamping and locating means in sequence.

10. In an indexing mechanism for muti-unit machine tools, the combination of a pair of indexing rails, a pair of upwardly facing rest rails respectively adjacent said indexing rails, a plurality of yieldably mounted pawls on said indexing rails, said pawls extending above the level of the tops of said rest rails and being engageable with work pieces resting on said rest rails, means to advance said indexing rails thereby through said pawls to move work pieces to successive operating stations on said rest rails, means cooperable directly with the work pieces to locate and clamp them at said stations downwardly against said rest rails, means to retract said indexing rails without disturbing the work pieces, and means to release said locating and clamping means from the work pieces upon completion of machining operations thereon.

11. In a multi-unit machine tool having a plurality of machining units, each unit having two spaced sets of similar tools arranged to perform the same operations upon work pieces, said units being spaced apart a distance equal to twice the spacing of the sets of tools on said units, and reciprocatory indexing means for advancing a plurality of work pieces successively to said units for having machining operations performed upon them by said units, said indexing means advancing said work pieces a distance equal to twice the spacing of said sets of tools, upon each reciprocatory cycle of said indexing means.

12. The combination set forth in claim 11, in which the stroke of said indexing means slightly exceeds twice the distance that said sets of tools are spaced apart.

13. A multi-unit machine tool having a plurality of work stations in a row, and having machine tool units spaced along said row, each unit having means for performing machining operations upon work pieces positioned at adjacent stations, there being an idle station between adjacent units, reciprocable indexing means having a stroke of sufficient length to advance the work pieces successively to alternate stations, locating and clamping means individual to each of said units for holding the work pieces in the stations adjacent said units, and interlocking control means for causing alternate operation of said indexing means and said locating and clamping means.

14. The combination set forth in claim 13 in which said indexing means has a reciprocatory stroke greater than twice the spacing of adjacent work stations.

15. In a machine tool having a plurality of machine tool units arranged in a row for performing successive operations upon work pieces, the combination of a plurality of rest stations spaced along the length of the row of said units, there being two rest stations adjacent each unit of the row and each having a work piece support, reciprocable indexing rails having means for directly engaging work pieces and advancing them successively from a rest station adjacent one of said units to a rest station adjacent the unit next in the row, means for reciprocating said indexing rails, and motor operated means for clamping the work pieces against said rest station supports.

16. The combination set forth in claim 15, in which said locating and clamping means comprises a clamp, an electric motor, and a lost motion power transmitting connection between said motor and said clamp.

17. The combination set forth in claim 15, in which said clamping means comprises a pair of clamps, an equalizer beam, means connecting the ends of said equalizer beam with said clamp respectively, an eccentric member for moving said beam by the application of a force to the center thereof, and means to rotate said eccentric member.

18. An indexing mechanism for machine tools comprising a pair of indexing rails, means for supporting said rails for longitudinal sliding movement, an oscillatory crank mechanism for reciprocating said rails, a reversible motor geared to said crank to oscillate the latter, and a reversing limit switch driven by said motor and operable at the end of each stroke of said crank mechanism to stop said motor and to condition said motor for operation in the reverse direction.

CHARLES H. MUHL.
JOHN BEISSMAN.
EARL E. OPEL.